(12) United States Patent
Castinado et al.

(10) Patent No.: US 11,587,072 B2
(45) Date of Patent: Feb. 21, 2023

(54) SYSTEM FOR SECURE RESOURCE TRANSFER INTEGRATION

(71) Applicant: BANK OF AMERICA CORPORATION, Charlotte, NC (US)

(72) Inventors: Joseph Benjamin Castinado, North Glenn, CO (US); Paul Benton Murphy, Tigard, OR (US); Naoll Addisu Merdassa, Shakopee, MN (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 27 days.

(21) Appl. No.: 17/325,986

(22) Filed: May 20, 2021

(65) Prior Publication Data
US 2022/0374871 A1 Nov. 24, 2022

(51) Int. Cl.
| | |
|---|---|
| *G06Q 20/00* | (2012.01) |
| *G06Q 20/36* | (2012.01) |
| *G06Q 20/10* | (2012.01) |
| *G06Q 20/38* | (2012.01) |

(52) U.S. Cl.
CPC ......... *G06Q 20/3674* (2013.01); *G06Q 20/10* (2013.01); *G06Q 20/3821* (2013.01); *G06Q 20/3829* (2013.01)

(58) Field of Classification Search
CPC ............... G06Q 20/3674; G06Q 20/10; G06Q 20/3821; G06Q 20/3829
USPC ................................ 705/16, 21; 380/44, 262
See application file for complete search history.

(56) References Cited

U.S. PATENT DOCUMENTS

| | | |
|---|---|---|
| 5,832,089 A | 11/1998 | Kravitz et al. |
| 9,811,818 B1 | 11/2017 | Xing |
| 10,147,076 B2 | 12/2018 | Zhou et al. |
| 10,373,158 B1 * | 8/2019 | James .................... G06Q 40/04 |
| 10,594,498 B2 | 3/2020 | Uhr et al. |
| 10,630,667 B2 | 4/2020 | Zhang |
| 10,652,022 B1 | 5/2020 | Delgado |
| 10,861,008 B2 | 12/2020 | Walters et al. |
| 2007/0234042 A1 | 10/2007 | Gantman et al. |
| 2011/0055585 A1 | 3/2011 | Lee |
| 2015/0052062 A1 | 2/2015 | Flomin et al. |
| 2015/0254640 A1 | 9/2015 | Cassano et al. |
| 2015/0262171 A1 | 9/2015 | Langschaedel et al. |
| 2016/0085955 A1 | 3/2016 | Lerner |
| 2016/0125403 A1 | 5/2016 | Hu et al. |

(Continued)

*Primary Examiner* — Dante Ravetti
(74) *Attorney, Agent, or Firm* — Moore & Van Allen PLLC; Anup Shrinivasan Iyer

(57) ABSTRACT

Systems, computer program products, and methods are described herein for secure resource transfer integration. The present invention is configured to electronically receive an access request to access a cold storage wallet associated with the user; initiate an authentication protocol to determine whether the user is authorized to access the cold storage wallet; provide access to the cold storage wallet to the user based on at least determining that the user is authorized to access the cold storage wallet; electronically receive a user request to transfer at least a portion of resources from the cold storage wallet to a resource distribution account associated with the user; execute the transfer of at least the portion of resources from the cold storage wallet to the resource distribution account; and display a notification indicating the execution of the transfer of at least the portion of resources.

20 Claims, 2 Drawing Sheets

(56) References Cited

U.S. PATENT DOCUMENTS

| | | |
|---|---|---|
| 2016/0180338 A1 | 6/2016 | Androulaki et al. |
| 2018/0077141 A1 | 3/2018 | Bailey, Jr. |
| 2018/0262331 A1 | 9/2018 | Noguchi et al. |
| 2019/0066439 A1 | 2/2019 | Pinkus |
| 2019/0095907 A1 | 3/2019 | Govindarajan et al. |
| 2019/0354971 A1 | 11/2019 | Ettensohn et al. |
| 2019/0356484 A1 | 11/2019 | Ettensohn et al. |
| 2020/0294039 A1 | 9/2020 | De Luca et al. |

* cited by examiner

SYSTEM FOR SECURE RESOURCE TRANSFER INTEGRATION

FIELD OF THE INVENTION

The present invention embraces a system for secure resource transfer integration.

BACKGROUND

There has been an increase in the usage and acceptance of digital currencies (e.g., cryptocurrencies) alongside a growing number of tokens and investors. However, with the increase in prominence comes the need for increased security. Currently, the onus to keep digital currencies safe falls on the user. This forces users to choose digital currency storage techniques which minimize likelihood of exposure. One such technique is using a cold storage wallet. As described herein, a cold storage wallet stores the digital currencies offline, entirely separate from any Internet access. However, to trade the digital currencies stored in the cold storage wallet, the user must transfer some digital currencies into a standard wallet. This involves physically requiring the cold storage to connect to a networked device and then implementing a currency transfer. Once transferred, the user has to identify an exchange that is suitable for trading the digital currencies. This process may become tedious and time consuming for an average user.

There is a need for a system for secure resource transfer integration.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for secure resource transfer integration is presented. The system comprising: at least one non-transitory storage device; and at least one processing device coupled to the at least one non-transitory storage device, wherein the at least one processing device is configured to: electronically receive, via a resource transfer integration platform installed on a computing device of a user, an access request to access a cold storage wallet associated with the user; initiate an authentication protocol to determine whether the user is authorized to access the cold storage wallet; provide, via the resource transfer integration platform, access to the cold storage wallet to the user based on at least determining that the user is authorized to access the cold storage wallet; electronically receive, via the resource transfer integration platform, a user request to transfer at least a portion of resources from the cold storage wallet to a resource distribution account associated with the user; execute the transfer of at least the portion of resources from the cold storage wallet to the resource distribution account based on at least the user request; and transmit control signals configured to cause the computing device of the user to display a notification indicating the execution of the transfer of at least the portion of resources.

In some embodiments, the at least one processing device is further configured to: execute the transfer of at least the portion of resources from the cold storage wallet to the resource distribution account, wherein executing further comprises: retrieving a private key associated with the cold storage wallet from a digital key repository; and accessing at least the portion of resources from the cold storage wallet using the private key; and transferring at least the portion of resources from the cold storage wallet to the resource distribution account.

In some embodiments, the at least one processing device is further configured to: retrieve at least the portion of resources from the cold storage wallet, wherein at least the portion of resources are in a first format, wherein the first format is incompatible with the resource distribution account; transform at least the portion of resources from the first format to a second format, wherein the second format is compatible with the resource distribution account; and store at least the portion of resources transformed to the second format in the resource distribution account.

In some embodiments, the at least one processing device is further configured to: initiate the authentication protocol, wherein initiating further comprises: transmitting, via the resource transfer integration platform, an authentication request; receiving, via the resource transfer integration platform, one or more authentication credentials from the user; validating the one or more authentication credentials; and determining that the user is authorized to access the cold storage wallet based on at least validating the one or more authentication credentials.

In some embodiments, the at least one processing device is further configured to: validate the one or more authentication credentials, wherein validating further comprises: determining an authorization level of the user based on at least the one or more authentication credentials; determining an authorization requirement associated with accessing the cold storage wallet; determining that the authorization level of the user meets the authorization requirement associated with accessing the cold storage wallet; and determining that the user is authorized to access the cold storage wallet based on at least determining that the authorization level of the user meets the authorization requirement associated with accessing the cold storage wallet.

In some embodiments, the at least one processing device is further configured to: continuously monitor an amount of resources in the cold storage wallet; determine that the amount of resources in the cold storage wallet has exceeded a predetermined threshold based on at least continuously monitoring the resources; and automatically initiate a transfer of a first portion of the resources from the cold storage wallet to the resource distribution account based on at least determining that the amount of resources in the cold storage wallet has exceeded the predetermined threshold.

In some embodiments, transferring the first portion of the resources from the cold storage wallet to the resource distribution account causes the amount of resources to fall below the predetermined threshold.

In another aspect, a computer program product for secure resource transfer integration is presented. The computer program product comprising a non-transitory computer-readable medium comprising code causing a first apparatus to: electronically receive, via a resource transfer integration platform installed on a computing device of a user, an access request to access a cold storage wallet associated with the user; initiate an authentication protocol to determine whether the user is authorized to access the cold storage wallet; provide, via the resource transfer integration platform, access to the cold storage wallet to the user based on at least determining that the user is authorized to access the cold storage wallet; electronically receive, via the resource transfer integration platform, a user request to transfer at least a portion of resources from the cold storage wallet to a resource distribution account associated with the user; execute the transfer of at least the portion of resources from the cold storage wallet to the resource distribution account based on at least the user request; and transmit control signals configured to cause the computing device of the user to display a notification indicating the execution of the transfer of at least the portion of resources.

In yet another aspect, a method for secure resource transfer integration is presented. The method comprising: electronically receiving, via a resource transfer integration platform installed on a computing device of a user, an access request to access a cold storage wallet associated with the user; initiating an authentication protocol to determine whether the user is authorized to access the cold storage wallet; providing, via the resource transfer integration platform, access to the cold storage wallet to the user based on at least determining that the user is authorized to access the cold storage wallet; electronically receiving, via the resource transfer integration platform, a user request to transfer at least a portion of resources from the cold storage wallet to a resource distribution account associated with the user; executing the transfer of at least the portion of resources from the cold storage wallet to the resource distribution account based on at least the user request; and transmitting control signals configured to cause the computing device of the user to display a notification indicating the execution of the transfer of at least the portion of resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
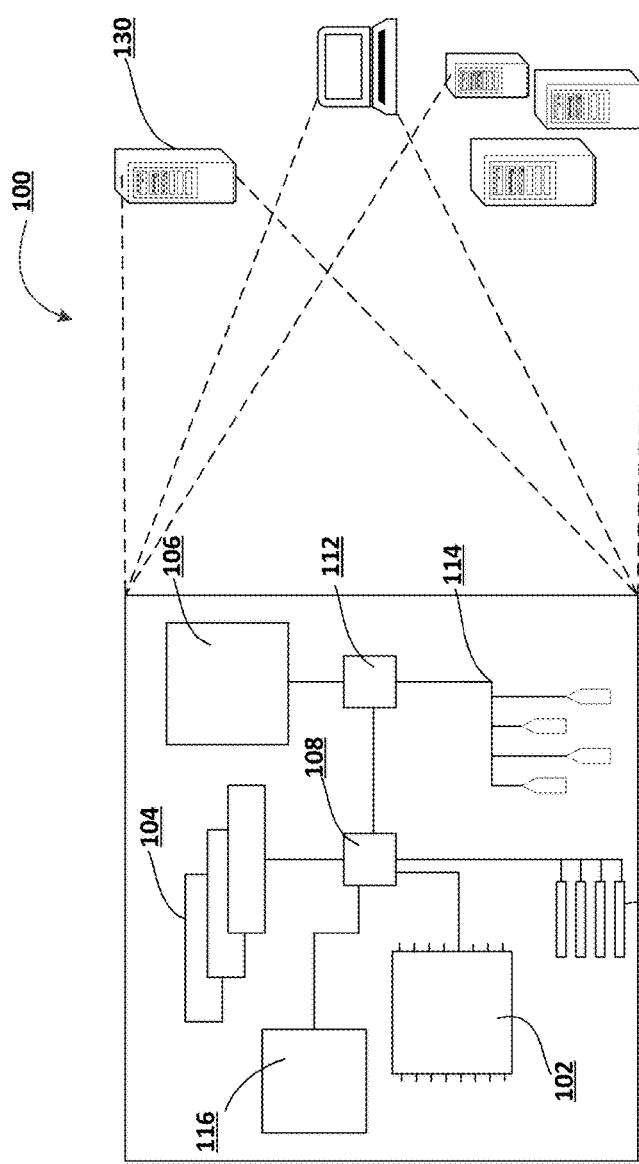
Figure 1:
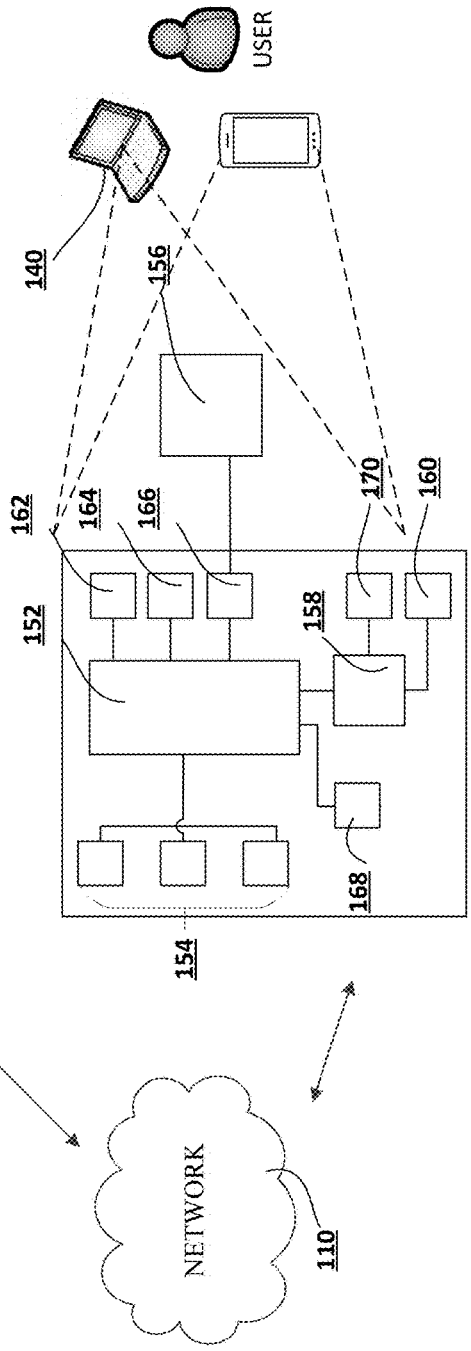
Figure 2:
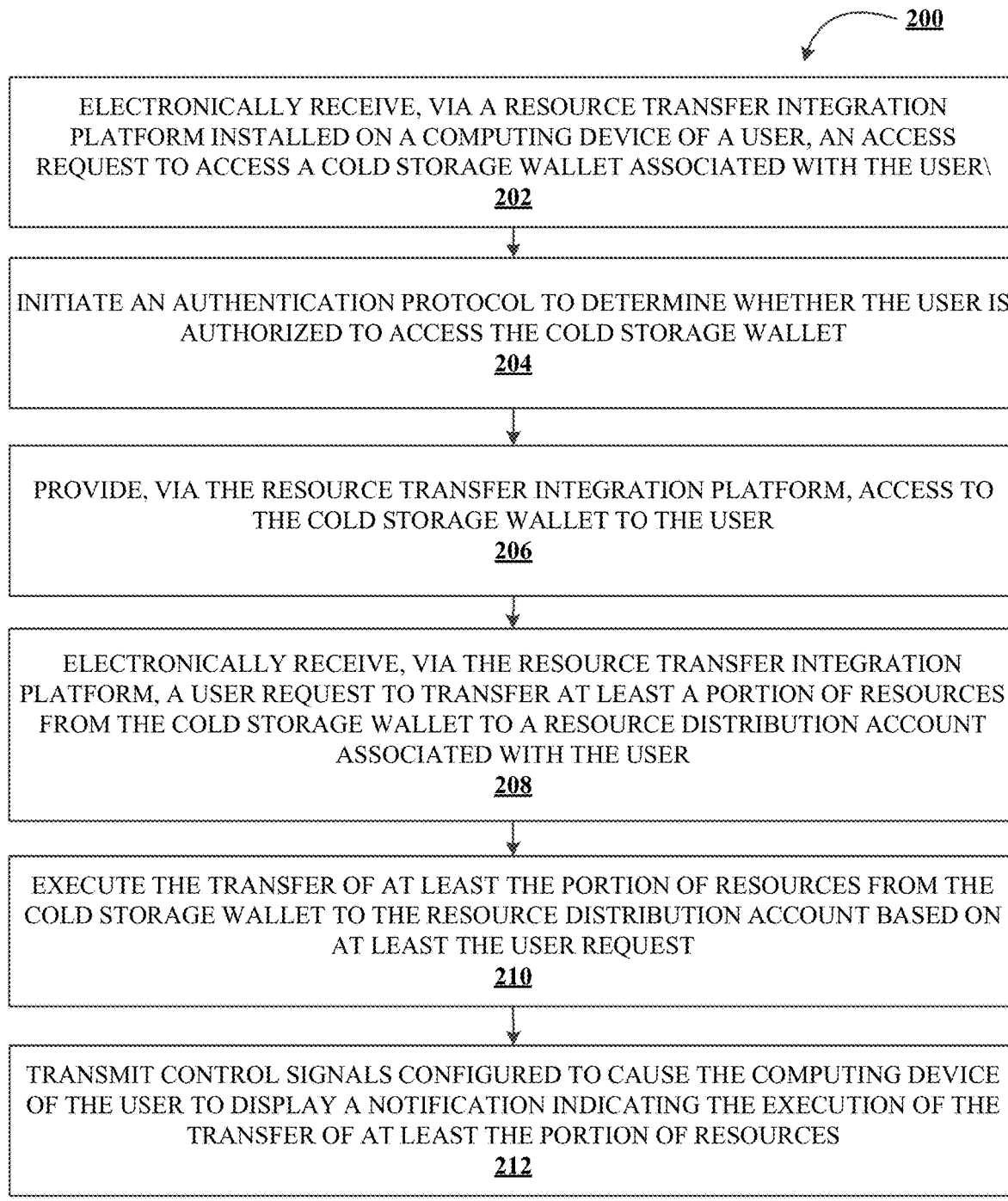

Having thus described embodiments of the invention in general terms, reference will now be made the accompanying drawings, wherein:

FIG. 1 illustrates technical components of a system for secure resource transfer integration, in accordance with an embodiment of the invention;

FIG. 2 illustrates a process flow for secure resource transfer integration, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, stored in digital or analog form, and the ability and opportunity to access and use the same. Some example implementations herein contemplate accounts held by a user, including accounts stored and/or maintained by an entity, a third-party, or in an entirely decentralized distributed network. Examples of resources associated with accounts may be accounts that have cash or cash equivalents, alternative currencies (e.g., digital currency), commodities, and/or accounts that are funded with or contain property, such as safety deposit boxes containing jewelry, art or other valuables, a trust account that is funded with property, or the like. In examples where a resource is a digital currency (digital money, electronic money, or electronic currency), managing, storing, monitoring, trading, and other resource transfer actions may be performed with the digital currency using digital wallets, such as a cold storage wallet.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, transfer of funds, or other interactions involving a user's resources. In the context of an entity such as a financial institution, a resource transfer may refer to one or more of: a sale of goods and/or services, initiating an automated teller machine (ATM) or online banking session, an account balance inquiry, a rewards transfer, conversion of resources from one form to another, an account money transfer or withdrawal, opening a bank application on a user's computer or mobile device, a user accessing their e-wallet, or any other interaction involving the user and/or the user's device that invokes or is detectable by the financial institution. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through any applicable transaction processing system.

As used herein, a "cold storage wallet" may refer to an offline digital wallet (typically a software program installed on an air gapped device) that is used to store resources (such as cash equivalents or alternative currencies). With cold storage, the digital wallet is typically not connected to the Internet, thereby protecting the wallet from unauthorized access. Each cold storage wallet may be associated with a private key and a public key. The private key allows the user to access the resources associated with the cold storage wallet. The public key is used to identify the cold storage wallet for resource transfers. In some embodiments, the private key may be a unique string of alphanumeric characters (or equivalent) provided to the user for safe-keeping.

FIG. 1 presents an exemplary block diagram of the system environment for secure resource transfer integration 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

There has been an increase in the usage and acceptance of digital currencies (e.g., cryptocurrencies) alongside a growing number of tokens and investors. However, with the increase in prominence comes the need for increased security. Currently, the onus to keep digital currencies safe falls on the user. This forces users to choose digital currency storage techniques which minimize likelihood of exposure. One such technique is using a cold storage wallet. As described herein, a cold storage wallet stores the digital currencies offline, entirely separate from any Internet access. However, to trade the digital currencies stored in the cold storage wallet, the user must transfer some digital currencies into a standard wallet. This involves physically requiring the cold storage to connect to a networked device and then implementing a currency transfer. Once transferred, the user has to identify an exchange that is suitable for trading the digital currencies. This process may become tedious and time consuming for an average user.

The present invention provides the functional benefit of implementing a resource integration platform that allows the user to transfer digital currencies from a cold storage wallet in the form of a plug-and-play model, and provide a suite of secure applications to allow the user to trade using the digital currencies. In this way, the present invention enables the user to navigate the complex and changing landscape of digital currencies. In addition, the present invention provides a safeguard for the user to aid in the financial services of the user ensuring their safety while navigating this landscape. In doing so, the entity managing the system becomes the custodian of the digital key repository in which the user may securely store the private keys that provide access to the cold storage wallets within the current technical infrastructure.

FIG. 2 illustrates a process flow for secure resource transfer integration 200, in accordance with an embodiment of the invention. As shown in block 202, the process flow includes electronically receiving, via a resource transfer integration platform installed on a computing device of a user, an access request to access a cold storage wallet associated with the user. In some embodiments, the resource transfer integration platform may include user interfaces configured to provide the user with the ability and opportunity to access and use resources stored in any resource distribution accounts the user has with the entity. In addition to the resource distribution accounts, the resource transfer integration platform may also include user interfaces that provide the user with the ability and opportunity to access and use resources associated with the cold storage wallets. In some embodiments, the resource integration platform, in addition to providing the user with the user interface to access and use the resources associated with the cold storage wallets, may also provide the user the user interfaces to access resources associated with any other resource distribution account associated with the user that is managed by the entity.

Next, as shown in block 204, the process flow includes initiating an authentication protocol to determine whether the user is authorized to access the cold storage wallet. In some embodiments, the authentication protocol used to determine whether the user is authorized to access the cold storage wallet may be same or similar to the authentication protocol user to determine whether the user is authorized to access a resource distribution account of the user. As part of the authentication protocol, the system may be configured to transmit, via the resource transfer integration platform, an authentication request. In response, the system may be configured to receive, via the resource transfer integration platform, one or more authentication credentials from the user. In response, the system may be configured to validate the one or more authentication credentials. In this regard, the system may be configured to determine an authorization level of the user based on at least the one or more authentication credentials. In response, the system may be configured to determine an authorization requirement associated with accessing the cold storage wallet. In response, the system may be configured to determine that that the authorization level of the user meets the authorization requirement associated with accessing the cold storage wallet. In response, the system may be configured to determine that the user is authorized to access the cold storage wallet based on at least determining that the authorization level of the user meets the authorization requirement associated with accessing the cold storage wallet. Once validated, the system may be configured to determine that the user is authorized to access the cold storage wallet based on at least validating the one or more authentication credentials.

Next, as shown in block 206, the process flow includes providing, via the resource transfer integration platform, access to the cold storage wallet to the user based on at least determining that the user is authorized to access the cold storage wallet. In some embodiments, by determining that the user is authorized to access the cold storage wallet, the system may be configured to also determine that the user is authorized to access any other resource distribution accounts associated with the user. In some other embodiments, the system may be configured to initiate and authentication protocol that is independent from the authentication protocol used to determine that the user is authorized to access the cold storage wallet, to determine whether the user is authorized to access any other resource distribution accounts. In one aspect, the authentication requirement associated with accessing the cold storage wallet may be same or similar to the authentication requirement associated with accessing any other resource distribution accounts. In other aspects, the authentication requirement associated with accessing the cold storage wallet may not be same or similar to the authentication requirement associated with accessing any other resource distribution accounts. So, in some cases, based on the authentication level of the user determined based on authentication credentials provided, the user may be authorized to access the cold storage wallet, but only a subset of the resource distribution accounts. To access the remaining subset of resource distribution accounts, the user may have to provide additional authentication credentials.

Next, as shown in block 208, the process flow includes electronically receiving, via the resource transfer integration platform, a user request to transfer at least a portion of resources from the cold storage wallet to a resource distribution account associated with the user.

Next, as shown in block 210, the process flow includes executing the transfer of at least the portion of resources from the cold storage wallet to the resource distribution account based on at least the user request. In some embodiments, to execute the transfer, the system may be configured to retrieve a private key associated with the cold storage wallet from a digital key repository. With the private key, the system may be configured to access at least the portion of resources from the cold storage wallet. In response to accessing at least the portion of resources associated with the cold storage wallet, the system may be configured to transfer at least the portion of resources from the cold storage wallet to the resource distribution account.

In some embodiments, the system may be configured to determine that at least the portion of resources are in a format (first format) that is incompatible with the resource distribution account. The resource distribution account may be configured to accept and store only resources that are in the first format. In examples where the resource distribution account is a financial checking account, the first format may be a particular currency such as dollars. In response, the system may be configured to transform at least the portion of resources into a format (second format) that is compatible with the resource distribution account. In examples where the cold storage wallet is associated with a digital currency, the second format may be a particular type of digital currency. Having transformed at least the portion of resources into a format that is compatible with the resource distribution account, the system may be configured to store at least the portion of resources in the resource distribution account.

Next, as shown in block 212, the process flow includes transmitting control signals configured to cause the computing device of the user to display a notification indicating the execution of the transfer of at least the portion of resources.

In some embodiments, the system may be configured to continuously monitor an amount of resources in the cold storage wallet. By monitoring the amount of resources in the cold storage wallet, the system may be configured to determine when the amount of resources in the cold storage wallet has exceeded a predetermined threshold. In some embodiments, the predetermined threshold may be set by the user. In some other embodiments, the predetermined threshold may be set by the entity automatically that may be modifiable by the user. If the amount of resources in the cold storage wallet exceeds the predetermined threshold, the system may be configured to automatically initiate a transfer of a first portion of the resources from the cold storage wallet to the resource distribution account based on at least determining that the amount of resources in the cold storage wallet has exceeded the predetermined threshold. In this regard, the system may be configured to allow the user to identify the cold storage wallet, set the predetermined threshold for that cold storage wallet, and identify the resource distribution account to which the user wishes to transfer the overflow resources. By transferring the first portion of the resources from the cold storage wallet to the resource distribution account, the system may be configured to maintain the amount of resources in the cold storage wallet below the predetermined threshold.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for secure resource transfer integration, the system comprising:

at least one non-transitory storage device; and at least one processing device coupled to the at least one non-transitory storage device, wherein the at least one processing device is configured to:

activating, by a processing device of a user, a user interface to receive access request to access a cold storage wallet associated with a user;

receiving, by the user interface, access request from the user to access a cold storage wallet associated with the user;

forwarding, by the user interface, the received request from the user to the processing device;

receiving, by the processing device of the user, the forwarded request from the user interface;

forwarding, by the processing device of the user, the received request to a resource transfer integration platform installed on a computing device of a user;

receiving, by the resource transfer integration platform, the forwarded request;

determining, by the resource transfer integration platform, that the received request comprises a request to access a cold storage wallet associated with the user;

based on a determination, by the resource transfer integration platform, that the received request comprises a request to access a cold storage wallet associated with the user, initiating, by the resource transfer integration platform, an authentication protocol that determines whether the requesting user is authorized to access the cold storage wallet and one or more resource distribution accounts;

determining, by the resource transfer integration platform, that the user is authorized to access the cold storage wallet and a subset of the one or more resource distribution accounts;

based on a determination, by the resource transfer integration platform, that the user is authorized to access the cold storage wallet and a subset of the one or more resource distribution accounts, providing, by the user interface, access to the cold storage wallet and the subset of the one or more resource distribution accounts to the user based on at least determining that the user is authorized to access the cold storage wallet and the subset of the one or more resource distribution accounts;

receiving, by the user interface, a user request to transfer at least a portion of resources from the cold storage wallet to a first resource distribution account associated with the user, wherein the first resource distribution account is associated with the subset of the one or more resource distribution accounts;

forwarding, by the user interface, the user request to transfer at least a portion of resources from the cold storage wallet to a first resource distribution account associated with the user to the resource transfer integration platform;

receiving, by the resource transfer integration platform, the forwarded user request to transfer at least a portion of resources from the cold storage wallet to a first resource distribution account associated with the user;

executing, by the resource transfer integration platform, the transfer of at least the portion of resources from the cold storage wallet to the first resource distribution account based on at least the user request;

transmitting, by the resource transfer integration platform, to the processing device of the user, control signals to cause the processing device of the user to display a notification indicating the execution of the transfer of at least the portion of resources;

receiving, by the processing device of the user, the transmitted control signals from the resource transfer integration platform; and displaying, by the processing device of the user, the notification indicating the execution of the transfer of at least the portion of resources.

2. The system of claim 1, wherein the at least one processing device is further configured to:

execute the transfer of at least the portion of resources from the cold storage wallet to the first resource distribution account, wherein executing further comprises:

retrieving a private key associated with the cold storage wallet from a digital key repository; and accessing at least the portion of resources from the cold storage wallet using the private key; and transferring at least the portion of resources from the cold storage wallet to the first resource distribution account.

3. The system of claim 2, wherein the at least one processing device is further configured to:

retrieve at least the portion of resources from the cold storage wallet, wherein at least the portion of resources are in a first format, wherein the first format is incompatible with the first resource distribution account;

transform at least the portion of resources from the first format to a second format, wherein the second format is compatible with the resource distribution account; and store at least the portion of resources transformed to the second format in the first resource distribution account.

4. The system of claim 1, wherein the at least one processing device is further configured to: initiate the authentication protocol, wherein initiating further comprises:

transmitting, via the resource transfer integration platform, an authentication request;

receiving, via the resource transfer integration platform, one or more authentication credentials from the user;

validating the one or more authentication credentials; and determining that the user is authorized to access the cold storage wallet based on at least validating the one or more authentication credentials.

5. The system of claim 4, wherein the at least one processing device is further configured to: validate the one or more authentication credentials, wherein validating further comprises:

determining an authorization level of the user based on at least the one or more authentication credentials;

determining an authorization requirement associated with accessing the cold storage wallet;

determining that the authorization level of the user meets the authorization requirement associated with accessing the cold storage wallet; and determining that the user is authorized to access the cold storage wallet based on at least determining that the authorization level of the user meets the authorization requirement associated with accessing the cold storage wallet.

6. The system of claim 1, wherein the at least one processing device is further configured to:

continuously monitor an amount of resources in the cold storage wallet;

determine that the amount of resources in the cold storage wallet has exceeded a predetermined threshold based on at least continuously monitoring the resources; and automatically initiate a transfer of a first portion of the resources from the cold storage wallet to the first resource distribution account based on at least determining that the amount of resources in the cold storage wallet has exceeded the predetermined threshold.

7. The system of claim 6, wherein transferring the first portion of the resources from the cold storage wallet to the first resource distribution account causes the amount of resources to fall below the predetermined threshold.

8. A computer program product for secure resource transfer integration, the computer program product comprising a non-transitory computer-readable medium comprising code causing a first apparatus to:

activate, by a processing device of a user, a user interface to receive access request to access a cold storage wallet associated with a user;

receive, by the user interface, access request from the user to access a cold storage wallet associated with the user;

forward, by the user interface, the received request from the user to the processing device;

receive, by the processing device of the user, the forwarded request from the user interface;

forward, by the processing device of the user, the received request to a resource transfer integration platform installed on a computing device of a user;

receive, by the resource transfer integration platform, the forwarded request;

determine, by the resource transfer integration platform, that the received request comprises a request to access a cold storage wallet associated with the user;

based on a determination, by the resource transfer integration platform, that the received request comprises a request to access a cold storage wallet associated with the user, initiate, by the resource transfer integration platform, an authentication protocol that determines whether the requesting user is authorized to access the cold storage wallet and one or more resource distribution accounts;

determine, by the resource transfer integration platform, that the user is authorized to access the cold storage wallet and a subset of the one or more resource distribution accounts;

based on a determination, the resource transfer integration platform, that the user is authorized to access the cold storage wallet and a subset of the one or more resource distribution accounts, provide, by the user interface, access to the cold storage wallet and the subset of the one or more resource distribution accounts to the user based on at least determining that the user is authorized to access the cold storage wallet and the subset of the one or more resource distribution accounts;

receive, by the user interface, a user request to transfer at least a portion of resources from the cold storage wallet to a first resource distribution account associated with the user, wherein the first resource distribution account is associated with the subset of the one or more resource distribution accounts;

forward, by the user interface, the user request to transfer at least a portion of resources from the cold storage wallet to a first resource distribution account associated with the user to the resource transfer integration platform;

receive, by the resource transfer integration platform, the forwarded user request to transfer at least a portion of resources from the cold storage wallet to a first resource distribution account associated with the user;

execute, by the resource transfer integration platform, the transfer of at least the portion of resources from the cold storage wallet to the first resource distribution account based on at least the user request;

transmit, by the resource transfer integration platform, to the processing device of the user, control signals to cause the processing device of the user to display a notification indicating the execution of the transfer of at least the portion of resources;

receiving, by the processing device of the user, the transmitted control signals from the resource transfer integration platform; and display, by the processing device of the user, the notification indicating the execution of the transfer of at least the portion of resources.

9. The computer program product of claim 8, wherein the first apparatus is further configured to:

execute the transfer of at least the portion of resources from the cold storage wallet to the first resource distribution account, wherein executing further comprises:
retrieving a private key associated with the cold storage wallet from a digital key repository; and
accessing at least the portion of resources from the cold storage wallet using the private key; and
transferring at least the portion of resources from the cold storage wallet to the first resource distribution account.

10. The computer program product of claim 9, wherein the first apparatus is further configured to:

retrieve at least the portion of resources from the cold storage wallet, wherein at least the portion of resources are in a first format, wherein the first format is incompatible with the first resource distribution account;
transform at least the portion of resources from the first format to a second format, wherein the second format is compatible with the first resource distribution account; and
store at least the portion of resources transformed to the second format in the first resource distribution account.

11. The computer program product of claim 8, wherein the first apparatus is further configured to: initiate the authentication protocol, wherein initiating further comprises:
transmitting, via the resource transfer integration platform, an authentication request;
receiving, via the resource transfer integration platform, one or more authentication credentials from the user;
validating the one or more authentication credentials; and
determining that the user is authorized to access the cold storage wallet based on at least validating the one or more authentication credentials.

12. The computer program product of claim 11, wherein the first apparatus is further configured to: validate the one or more authentication credentials, wherein validating further comprises:
determining an authorization level of the user based on at least the one or more authentication credentials;
determining an authorization requirement associated with accessing the cold storage wallet;
determining that the authorization level of the user meets the authorization requirement associated with accessing the cold storage wallet; and
determining that the user is authorized to access the cold storage wallet based on at least determining that the authorization level of the user meets the authorization requirement associated with accessing the cold storage wallet.

13. The computer program product of claim 8, wherein the first apparatus is further configured to:
continuously monitor an amount of resources in the cold storage wallet;
determine that the amount of resources in the cold storage wallet has exceeded a predetermined threshold based on at least continuously monitoring the resources; and
automatically initiate a transfer of a first portion of the resources from the cold storage wallet to the first resource distribution account based on at least determining that the amount of resources in the cold storage wallet has exceeded the predetermined threshold.

14. The computer program product of claim 13, wherein transferring the first portion of the resources from the cold storage wallet to the first resource distribution account causes the amount of resources to fall below the predetermined threshold.

15. A method for secure resource transfer integration, the method comprising:
activating, by a processing device of a user, a user interface to receive access request to access a cold storage wallet associated with a user;
receiving, by the user interface, access request from the user to access a cold storage wallet associated with the user;
forwarding, by the user interface, the received request from the user to the processing device;
receiving, by the processing device of the user, the forwarded request from the user interface;
forwarding, by the processing device of the user, the received request to a resource transfer integration platform installed on a computing device of a user;
receiving, by the resource transfer integration platform, the forwarded request;
determining, by the resource transfer integration platform, that the received request comprises a request to access a cold storage wallet associated with the user;
based on a determination, by the resource transfer integration platform, that the received request comprises a request to access a cold storage wallet associated with the user, initiating, by the resource transfer integration platform, an authentication protocol that determines whether the requesting user is authorized to access the cold storage wallet and one or more resource distribution accounts;
determining, by the resource transfer integration platform, that the user is authorized to access the cold storage wallet and a subset of the one or more resource distribution accounts;
based on a determination, by the resource transfer integration platform, that the user is authorized to access the cold storage wallet and a subset of the one or more resource distribution accounts, proving, by the user interface, access to the cold storage wallet and the subset of the one or more resource distribution accounts to the user based on at least determining that the user is authorized to access the cold storage wallet and the subset of the one or more resource distribution accounts;
receiving, by the user interface, a user request to transfer at least a portion of resources from the cold storage wallet to a first resource distribution account associated with the user, wherein the first resource distribution account is associated with the subset of the one or more resource distribution accounts;
forwarding, by the user interface, the user request to transfer at least a portion of resources from the cold storage wallet to a first resource distribution account associated with the user to the resource transfer integration platform;

receiving, by the resource transfer integration platform, the forwarded user request to transfer at least a portion of resources from the cold storage wallet to a first resource distribution account associated with the user;

executing, by the resource transfer integration platform, the transfer of at least the portion of resources from the cold storage wallet to the first resource distribution account based on at least the user request;

transmitting, by the resource transfer integration platform, to the processing device of the user, control signals to cause the processing device of the user to display a notification indicating the execution of the transfer of at least the portion of resources;

receiving, by the processing device of the user, the transmitted control signals from the resource transfer integration platform; and displaying, by the processing device of the user, the notification indicating the execution of the transfer of at least the portion of resources.

16. The method of claim 15, wherein the method further comprises executing the transfer of at least the portion of resources from the cold storage wallet to the first resource distribution account, wherein executing further comprises:

retrieving a private key associated with the cold storage wallet from a digital key repository; and accessing at least the portion of resources from the cold storage wallet using the private key; and transferring at least the portion of resources from the cold storage wallet to the first resource distribution account.

17. The method of claim 16, wherein the method further comprises:

retrieving at least the portion of resources from the cold storage wallet, wherein at least the portion of resources are in a first format, wherein the first format is incompatible with the first resource distribution account;

transforming at least the portion of resources from the first format to a second format, wherein the second format is compatible with the first resource distribution account; and storing at least the portion of resources transformed to the second format in the first resource distribution account.

18. The method of claim 15, wherein the method further comprises initiating the authentication protocol, wherein initiating further comprises:

transmitting, via the resource transfer integration platform, an authentication request;

receiving, via the resource transfer integration platform, one or more authentication credentials from the user;

validating the one or more authentication credentials; and determining that the user is authorized to access the cold storage wallet based on at least validating the one or more authentication credentials.

19. The method of claim 18, wherein the method further comprises validating the one or more authentication credentials, wherein validating further comprises:

determining an authorization level of the user based on at least the one or more authentication credentials;

determining an authorization requirement associated with accessing the cold storage wallet;

determining that the authorization level of the user meets the authorization requirement associated with accessing the cold storage wallet; and determining that the user is authorized to access the cold storage wallet based on at least determining that the authorization level of the user meets the authorization requirement associated with accessing the cold storage wallet.

20. The method of claim 15, wherein the method further comprises:

continuously monitoring an amount of resources in the cold storage wallet;

determining that the amount of resources in the cold storage wallet has exceeded a predetermined threshold based on at least continuously monitoring the resources; and automatically initiating a transfer of a first portion of the resources from the cold storage wallet to the first resource distribution account based on at least determining that the amount of resources in the cold storage wallet has exceeded the predetermined threshold.

\* \* \* \* \*